United States Patent [19]

Huguenin

[11] Patent Number: 5,031,548
[45] Date of Patent: Jul. 16, 1991

[54] SAFE ASSEMBLY

[76] Inventor: Gaston Huguenin, Boulevard du Grand Marché, Quetigny, France

[21] Appl. No.: 275,228

[22] Filed: Nov. 22, 1988

[30] Foreign Application Priority Data

Nov. 24, 1987 [EP] European Pat. Off. ............ 87402650

[51] Int. Cl.⁵ ............................................. E05G 1/00
[52] U.S. Cl. ....................................... 109/45; 109/48; 109/50; 224/42.08
[58] Field of Search ..................... 109/50–52, 109/45, 48; 248/551; 211/150; 224/42.44, 42.32, 42.03 A, 42.08

[56] References Cited

U.S. PATENT DOCUMENTS

| | | | |
|---|---|---|---|
| 1,222,739 | 4/1917 | DeChime | 109/50 |
| 1,959,291 | 5/1934 | Millice | 109/51 |
| 3,202,332 | 8/1965 | Walker | 224/42.08 X |
| 3,908,942 | 9/1975 | Keith et al. | 109/52 X |
| 4,089,554 | 5/1978 | Myers | 224/42.03 A X |
| 4,098,199 | 7/1878 | Haje | 109/52 |
| 4,457,240 | 7/1984 | Hungerford | 109/45 |
| 4,664,041 | 5/1987 | Wood | 109/51 |

FOREIGN PATENT DOCUMENTS 3420880 5/1985 Fed. Rep. of Germany.
2105399 3/1983 United Kingdom.

Primary Examiner—Lloyd A. Gall
Attorney, Agent, or Firm—Weingarten, Schurgin, Gagnebin & Hayes

[57] ABSTRACT

This invention relates to a safe assembly whose outer shape is generally parallelepipedic defined by a width, a height and a depth, one of the dimensions—height and width—being smaller than the depth, this assembly being mounted on a fastening structure. The safe is mounted on the structure by means of a pivot pin which is at right angles to that of the two dimensions which is smaller than the depth, and which is inaccessible from outside the safe, so that, with respect to the structure, this safe is capable of occupying a first position in which, the depth being non-parallel to a reference plane, the inconvenience caused by the bulk of the safe is considerable, and a second position in which the depth extends parallel to said reference plane, the inconvenience caused by the bulk of the safe being reduced. One application of the present invention is the positioning of a safe in the boot of a private car.

26 Claims, 14 Drawing Sheets

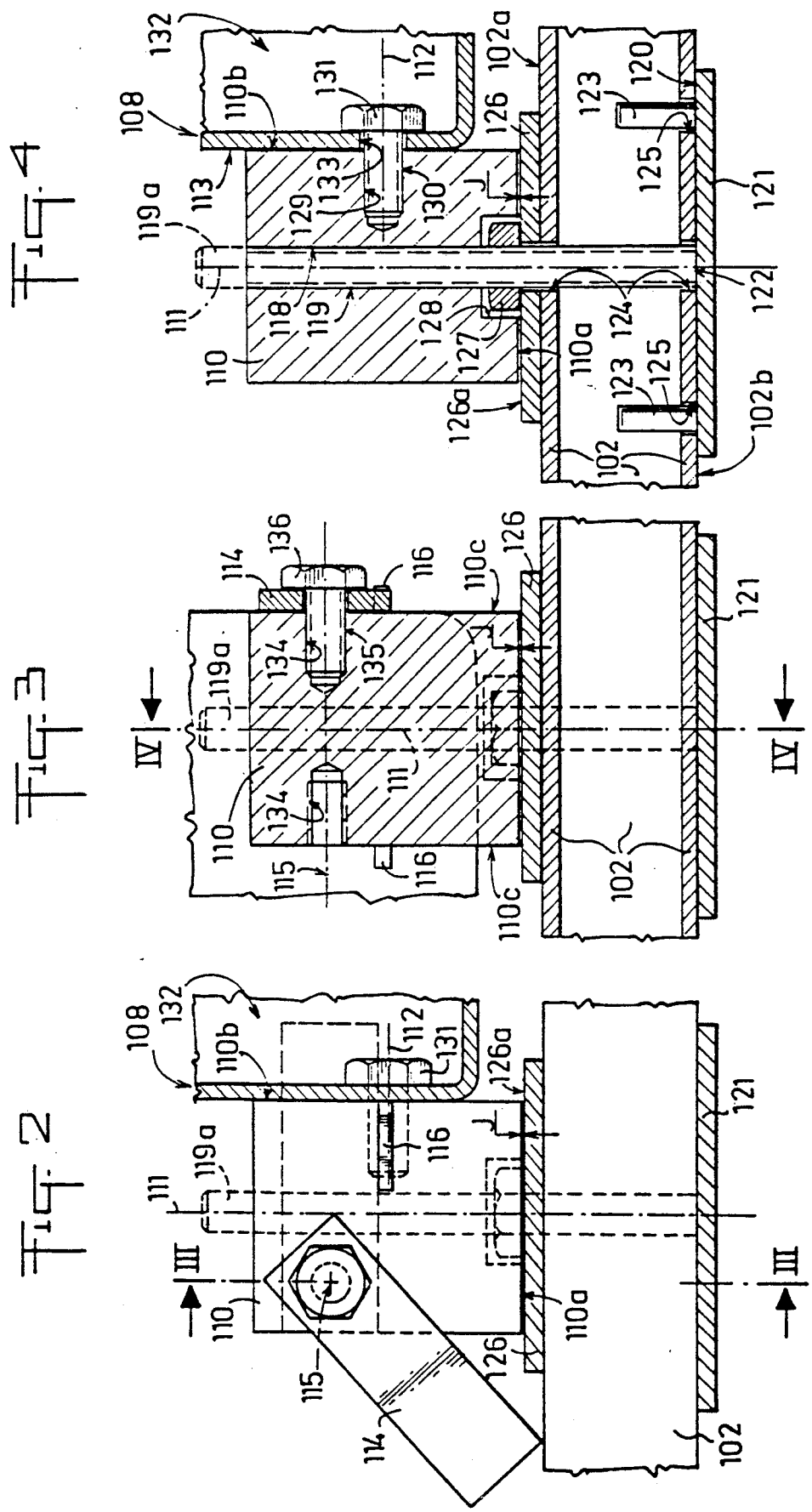

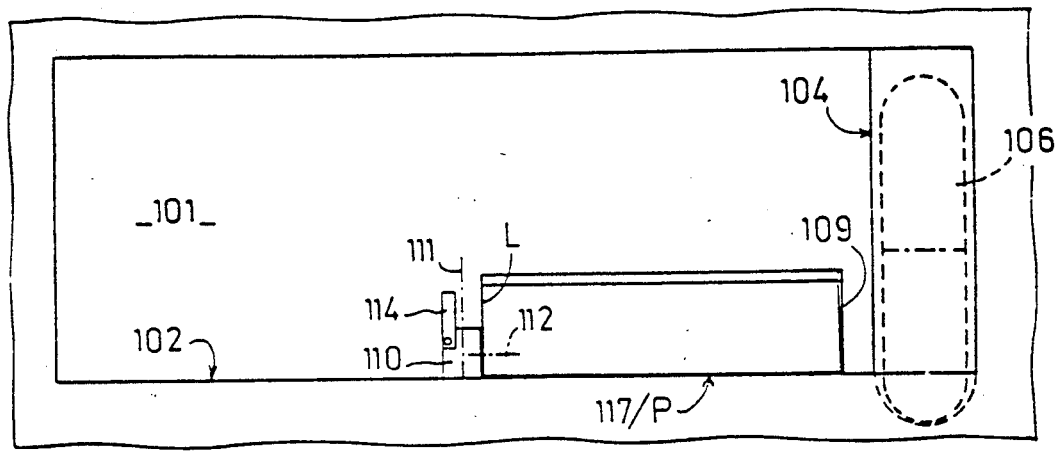
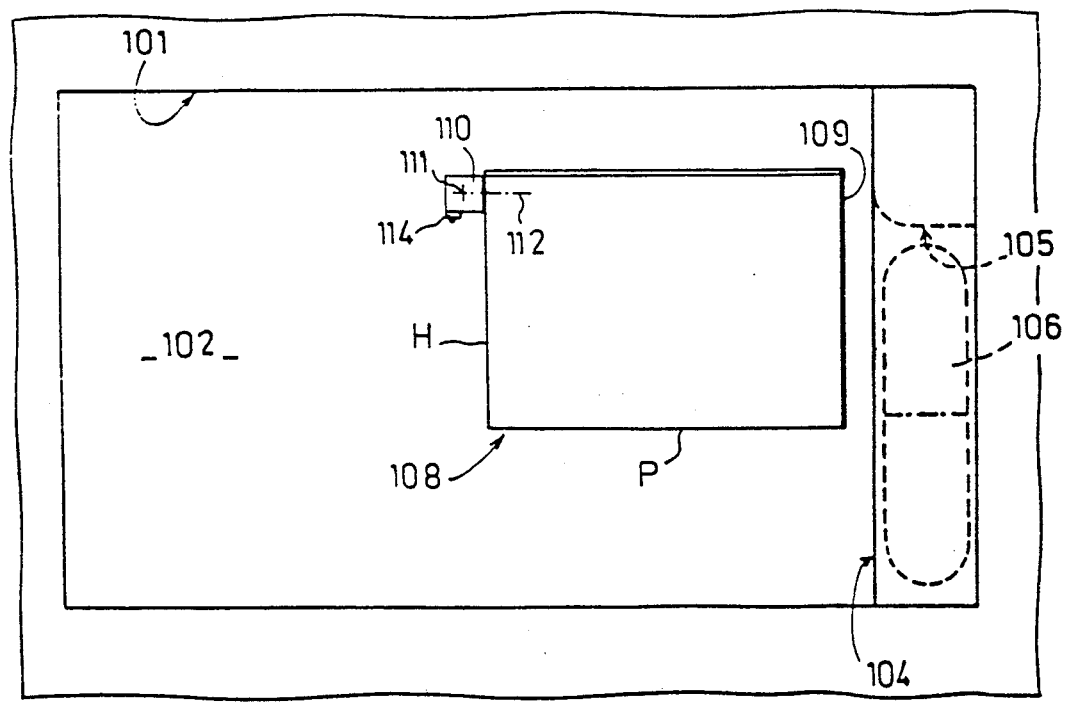

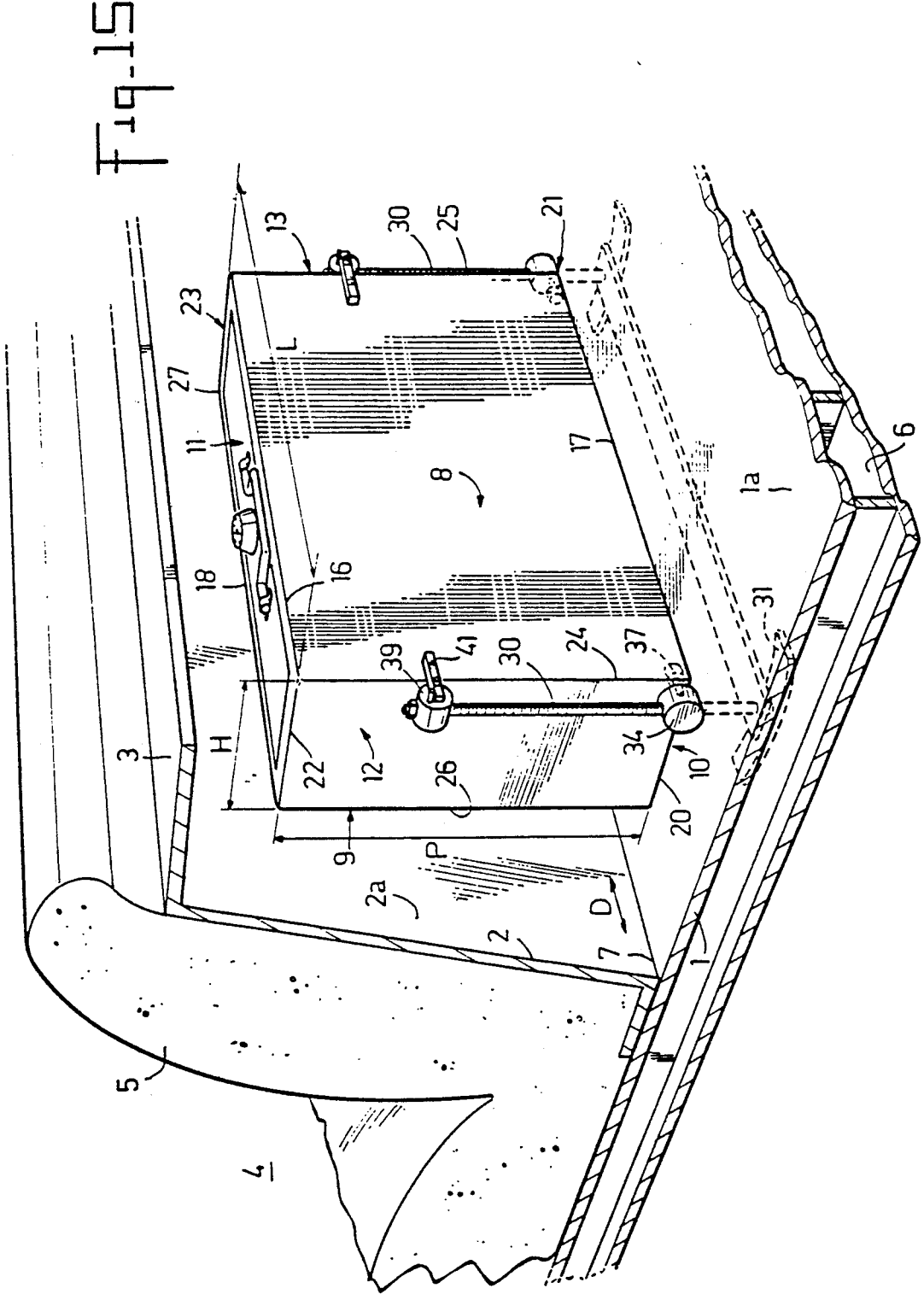
Fig_15

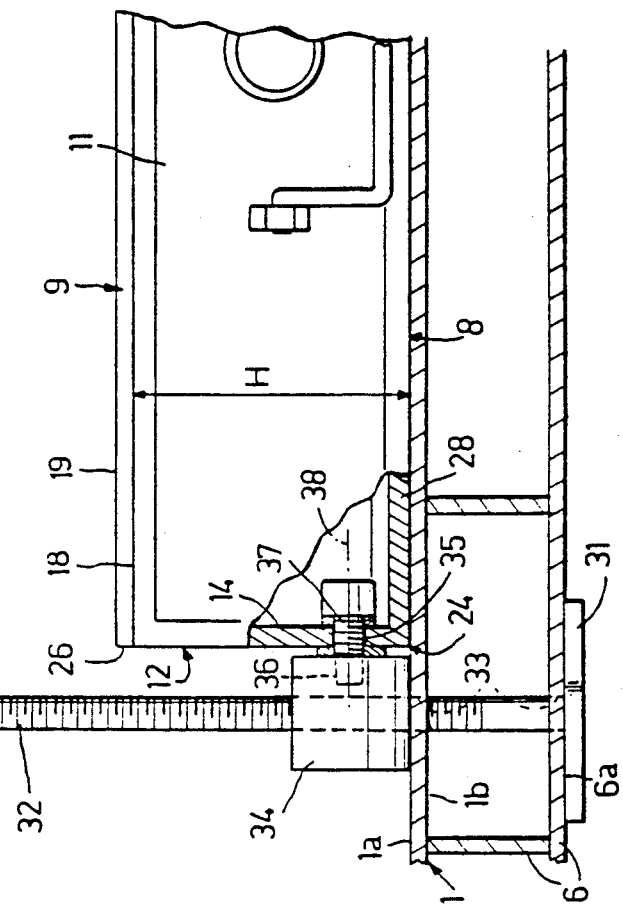
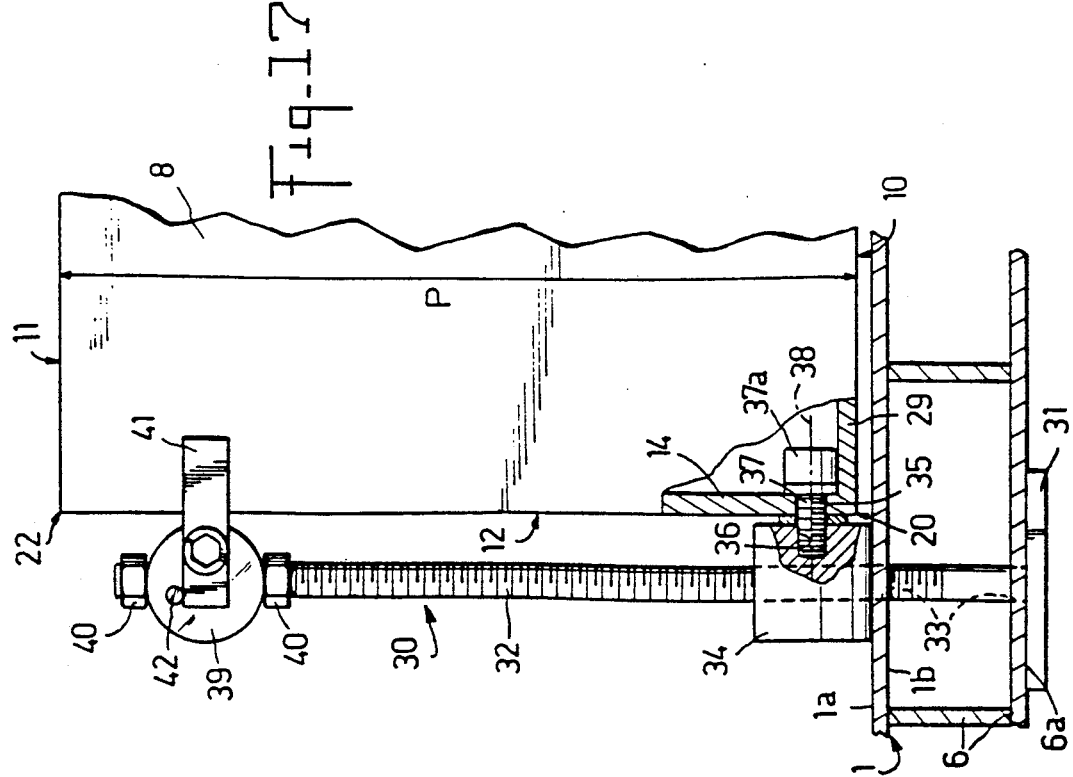

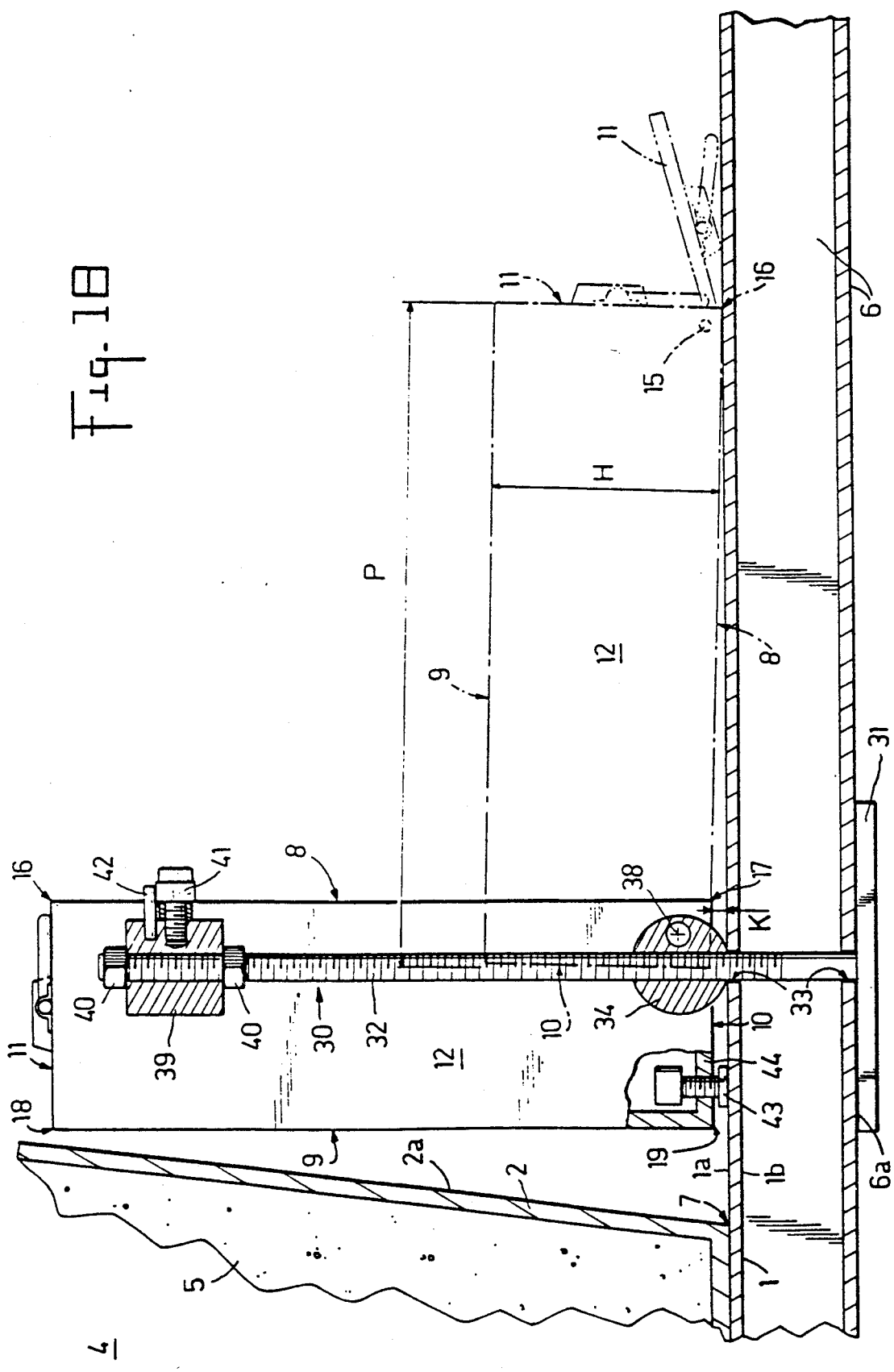

SAFE ASSEMBLY

FIELD OF THE INVENTION

The present invention relates to a safe assembly.

BACKGROUND OF THE INVENTION

Many motorists, having left precious objects or documents in their vehicles, have been unpleasantly surprised to discover that these objects or documents have been stolen from their parked vehicles. The remedy would apparently be to leave nothing in the vehicle, but this is not always very easy when travelling.

It is an object of the invention to overcome this problem by providing a safe in the vehicle. Of course, this safe must not be easily detachable from the structure of the vehicle, against the wishes of its owner.

Most vehicles are not intended to transport a safe and it is therefore important to have the possibility of moving the safe within the enclosure in which it is disposed, whilst maintaining it vandal-and burglar-proof, so as to render the presence of the safe as discreet as possible with respect to the normal use of the vehicle. For example, where the safe is contained inside the boot of a private car, every effort must be made, whilst leaving the safe attached to the structure of this vehicle, to enable it to occupy several locations which do not hinder the luggage.

GB-A-2 105 399 describes the conventional installation of a safe in a vehicle, the safe being permanently fixed in one single position inside the vehicle.

U.S. Pat. No. US-A-4 457 240 discloses a resistant box adapted to be carried by its owner, but, apparently, being fixable on the structure of a vehicle only at one location. There again, the problem of the inconvenience of the presence of such an object in an enclosure initially intended for another use has not been seen and no solution has been proposed to minimize it. Moreover, the very shape of the box represented does not render it particularly practical for transporting, in safety, precious objects such as for example small cases, briefcases, attaché cases, capable of containing precious objects or documents.

From these observations, the invention has defined the concept of a safe assembly usable in vehicles, adapted to be placed in the boot, or elsewhere, depending on its size, but also usable in non-mobile dwellings and in mobile machines, other than automobile vehicles, such as public works machines, aircraft or low-tonnage ships.

SUMMARY OF THE INVENTION

The invention therefore relates to a safe assembly whose outer shape is generally parallelepipedic, defined by a width, a height and a depth, one of the dimensions—height and width—being notably smaller than the depth, this assembly being mounted on a fastening structure.

According to the invention, the safe is mounted on the structure by means of at least one first pivot pin permanently oriented in a direction substantially parallel to a face of the safe defined by said height and width and substantially at right angles to that of these two dimensions which is notably smaller than the depth, said first pivot pin being, in addition, inaccessible from the environment outside the safe, so that, with respect to said structure, this safe is capable of occupying a first position, in which, the depth being non-parallel to a first reference plane (being perpendicular or oblique with respect to said first reference plane), the inconvenience of the bulk of the safe is considerable, and a second position which follows from said first position by pivoting the safe about the first pivot pin and in which the depth extends parallel to said first reference plane, the inconvenience caused by the bulk of the safe then being considerably reduced compared to that corresponding to the first position of the safe.

The following advantageous arrangements are, in addition, preferably adopted:

According to a first variant embodiment, a second pivot pin, substantially orthogonal to said first pivot pin and inaccessible from the environment outside the safe, effects pivoting assembly of the safe with respect to a support which, itself, is mounted to pivot with respect to the structure about said first pivot pin, so that, with respect to said structure, the safe is capable of occupying a third position which follows from the second position at least by a pivoting of the safe about the second pivot pin and in which, on the one hand, the depth extends parallel to a second reference plane, on the other hand, the inconvenience caused by the bulk of the safe is considerably reduced compared to that corresponding to said first position of the safe.

According to a second variant embodiment, the first pivot pin is mounted on a support which is itself mounted to pivot with respect to the structure about a second pivot pin substantially orthogonal to said first pivot pin and inaccessible from the environment outside the safe, so that, with respect to said structure, the safe is capable of occupying a third position which follows from the second position at least by a pivoting of the safe about the second pivot pin and in which, on the one hand, the depth extends parallel to a second reference plane, on the other hand, the inconvenience caused by the bulk of the safe is considerably reduced with respect to that corresponding to said first position of the safe.

In these embodiments, the assembly advantageously comprises a device for selectively holding the safe in its second position.

The assembly comprises a rod presenting two ends, a first of said ends being rendered fast with the structure and the second end being threaded, whilst said support comprises, on the one hand, a tapped bore which cooperates with said second threaded end of the rod for pivoting assembly of said support, on the other hand, a tapped hole whose axis is orthogonal to that of said bore, a screw, comprising a screw head and a threaded part, having its threaded part traversing a hole provided in one of the walls of the safe, the screw head being disposed inside the safe and the threaded part of the screw cooperating with the tapped hole for pivoting assembly of the safe with respect to the support.

The first end of the rod is fast with a plate provided with at least one catch, whilst the structure comprises a through hole adapted to be traversed by said rod and at least one housing adapted to receive said catch, the rod traversing the hole, the catch being received in the housing, and a nut cooperating with the thread of the second end of the rod for fixation of said rod on the structure until said plate is applied on a face defining the structure.

The first end of the rod is fast with a first face of a first plate; however, at least two first curved hooks are fast with said first plate, being fixed on a second face of this first plate opposite said first face and each comprise a free end oriented towards and moved away from the plane of the second face of the first plate; the structure comprises a first face oriented in direction opposite that of erection of the threaded rod with respect to said structure, a second face opposite said first face of the structure, and first holes for passage of said first hooks; a second plate comprises, on the one hand, at least one second curved hook which is fast therewith and which is fixed on a face of this second plate, each second hook comprising a free end oriented towards and moved apart from the plane of said face of the second plate, on the other hand, a notch for passage of said rod; the structure further comprises at least one second hole for passage of the second or hook(s); and the assembly of said first and second plates on the structure is such that the first hooks pass through the first holes until, on the one hand, the second face of the first plate is in abutment on the second face of the structure, on the other hand, the free ends of the first hooks are located in the vicinity of or in contact with the first face of the structure; the second hook(s) pass through the corresponding second holes until, on the one hand, the face of the second plate is in abutment on the first face of the first plate, on the other hand, the free end of each second hook is located in the vicinity of or in contact with the first face of the structure; said rod has traversed the notch of the second plate; and a nut, cooperating with the threaded end of the rod, maintains the first and second plates in mutual abutment and assembled, consequently preventing the first and second hooks from leaving their respective holes.

The support comprises a recess in which the nut is capable of being contained.

A tongue is mounted to pivot on the support, whilst a stop for limiting its clearance is fast with said support, the assembly constituting a device for selectively holding the safe in its second position.

Finally, according to another variant embodiment, the structure comprises a wall defined by an upper face and by a lower face accessible to a safe assembler, the device for assembling the safe being constituted by:

two rods which pass through said wall, being placed on either side of the safe and extending substantially perpendicularly to the wall, each of these rods having a first end constituting the support of a support plate and having the second end provided with a thread, two nuts which cooperate with said threads so as to place said support plates in abutment on a face of the wall and thus to fix said rods to the wall, and two screws which each cooperate with a tapped hole made in each nut, substantially at right angles with respect to the axis of the corresponding rod, which each traverse a hole made in two opposite walls of the safe and whose (screw) heads are contained within the safe and are accessible only by the interior of this safe.

In this latter embodiment, at least one of the rods has its upper end which extends upwardly beyond the corresponding nut, whilst the device for selectively holding the safe in its second position is fixed on the upper end of said rod and is constituted by at least one latch which is mounted to pivot on a support screwed and immobilized on the upper end of said rod and on which the face of the safe, by which the latter rests on the floor when it is placed in its first position, is capable of being in abutment in order to limit the pivoting of the safe when the latter is then placed in its second position.

BRIEF DESCRIPTION OF THE DRAWINGS

The invention will be more readily understood on reading the, following description with reference to the accompanying drawings, in which:

FIG. 2 is a view in elevation of an element constituting the assembly of FIG. 1.

FIG. 3 is a section along III—III of FIG. 2.

FIG. 4 is a section along IV—IV of FIG. 3.

FIGS. 7A and 7B are views, from above and the front, respectively, of a third position occupied by the safe of FIG. 1.

FIG. 15 is a perspective view of a third variant embodiment of a safe assembly according to the invention.

FIG. 16 is a view of the safe of FIG. 15, with partial section, in a first position of this safe.

FIG. 17 a view similar to that of FIG. 16, of the same safe, but in a second position of this safe; and FIG. 18 is a side view, with partial section, showing the safe of FIGS. 16 and 17 in its two positions.

DETAILED DESCRIPTION OF THE DRAWINGS

Figure 1:
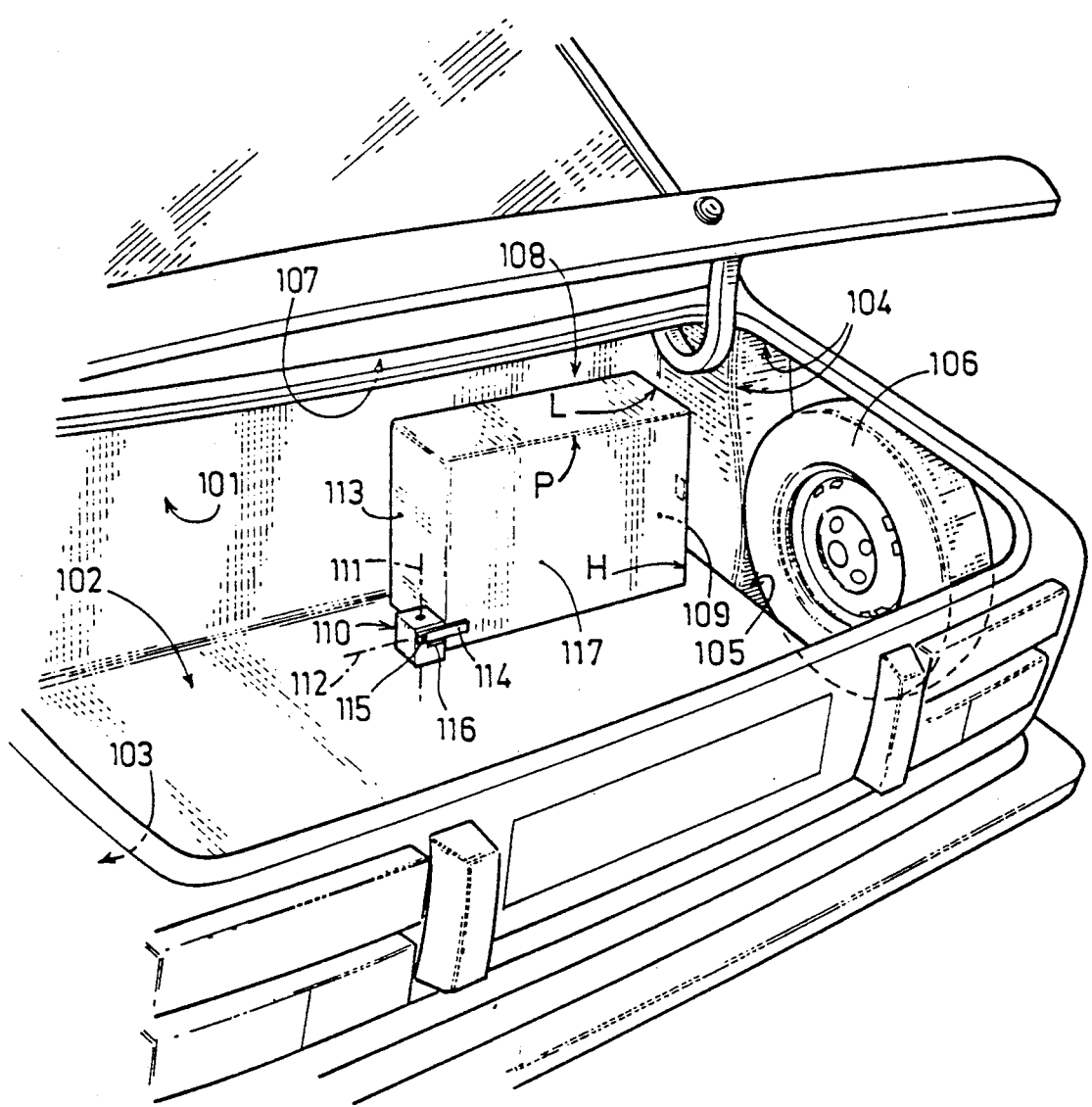
FIG. 1 is a view in perspective of a first embodiment according to the invention.

Referring now to the drawings, FIG. 1 schematically shows the interior of the boot of a private car defined by the substantially vertical rear wall 101, the substantially horizontal floor 102, a left-hand vertical lateral wall 103, a right-hand vertical lateral opening 104 giving access to the housing 105 for a spare wheel 106 and a horizontal upper wall 107. Inside this boot is disposed a safe 108, of parallelepipedic shape, adapted to contain, for example, a leather briefcase, a small case, attaché case, or the like. The installation of this safe will be described hereinafter with reference to FIGS. 5A, 5B, 6A, 6B, 7A and 7B, of which the three dimensions are the depth P, perpendicular to the door 109 giving access to the safe, in the closed configuration of the safe, the width L and the height H, the height H and depth P corresponding to the largest dimensions of the document case to be protected, and the width L corresponding, on the contrary, to the small dimension of this case. This width L is therefore notably smaller (between ⅓rd and 1/5th) than the other two dimensions, particularly the depth P.

A parallelepipedic support 110 is mounted to pivot on the structure of the floor 102 about a vertical geometrical axis 111 and bears a pivot pin about a horizontal geometrical axis 112, which is perpendicular to the face 113 of the safe opposite door 109, the safe being mounted to pivot with respect to support 110 about the geometrical axis 112. It will also be observed that a rectangular tongue 114 is mounted to pivot on the support 110 about a geometrical axis 115 at right angles to the other two geometrical axes 111 and 112, this tongue 114 being maintained horizontally by abutting on the upper face of a projection 116 provided on the front face of the support 110, and thus being disposed opposite one (117) of the large faces of the safe, maintaining the latter in upright position, near the rear 101 of the boot, the width L being perpendicular to this rear 101 and the depth P and the height H being parallel to rear 101.

The support 110 and its assembly present the following particular features:

the support 110 comprises a tapped bore 118 with vertical geometrical axis 111;

a threaded rod 119, adapted to screw in the tapped bore 118, is erected vertically from the upper face 120 of a plate 121 on which its lower end 122 is welded, said plate 121 being in addition provided with two vertical catches 123 likewise welded on its upper face 120;

the floor 102 is constituted by a composite structure of two horizontal sheets maintained in spaced apart relationship by connecting webs, comprising a through hole 124 and two lower blind holes 125, the rod 119 passing through the hole 124, as well as a support plate 126 disposed in abutment on the upper face 102a of the floor 102, and the catches 123 passing in holes 125, a nut 127, screwed on the threaded rod 119, making it possible to fasten the latter to the floor 102 by placing the upper face 120 of the plate 121 in abutment on the lower face 102b of the floor, and tightening the support plate 126 on the upper face 102a of the floor;

the support 110 comprises a recess 128 whose dimensions allow reception of the nut 127, when said support is almost totally screwed on the threaded rod 119;

a clearance J is made between the lower face 110a of the support 110 and the upper face 126a of the support plate 126, sufficient to allow complementary screwing of the support on the threaded rod of about a half-turn;

a horizontal tapped hole 129, opening out in a vertical face 110b of the support 110 and of geometrical axis 112, receives the thread 130 of a screw whose screw head 131 is disposed in the interior 132 of the safe 108 and is, moreover, accessible only by the interior of the safe;

to that end, the thread 130 passes through a hole 133 made in the face 113 of the safe, this effecting pivoting assembly of said safe with respect to the support 110 about the geometrical axis 112;

in each of the two vertical faces 110c of the support 110, perpendicular to face 110b, open out two tapped holes 134 which each make it possible to receive the thread 135 of a screw for pivoting assembly of the tongue 114 about the horizontal geometrical axis 115, the tongue 114 being retained by the head 136 of the screw;

on each face 110c is disposed a stop 116 for the tongue 114 to be able to extend horizontally and to be maintained in this position (broken lines in FIG. 2);

holes 134 and stops 116 are disposed symmetrically with respect to the vertical plane parallel to faces 110c and passing through the geometrical axis 111, respectively.

The device of FIGS. 2, 3 and 4 may have several applications.

A first application is shown with reference to FIGS. 1, 5A, 5B, 6A, 6B, 7A and 7B.

According to this application, the face of the safe is the side that the user has, at least partially, in front of him when he wishes to place an object in the safe or remove it therefrom; it is the side which is provided with the door 109 of the safe. The safe is mounted to pivot with respect to the support 110 by means of the screw 130-131 which is introduced inside the safe, and whose threaded part 130 passes through the hole 133 made in the lower front part of the wall of the safe defined externally by face 113.

Figure 6B:
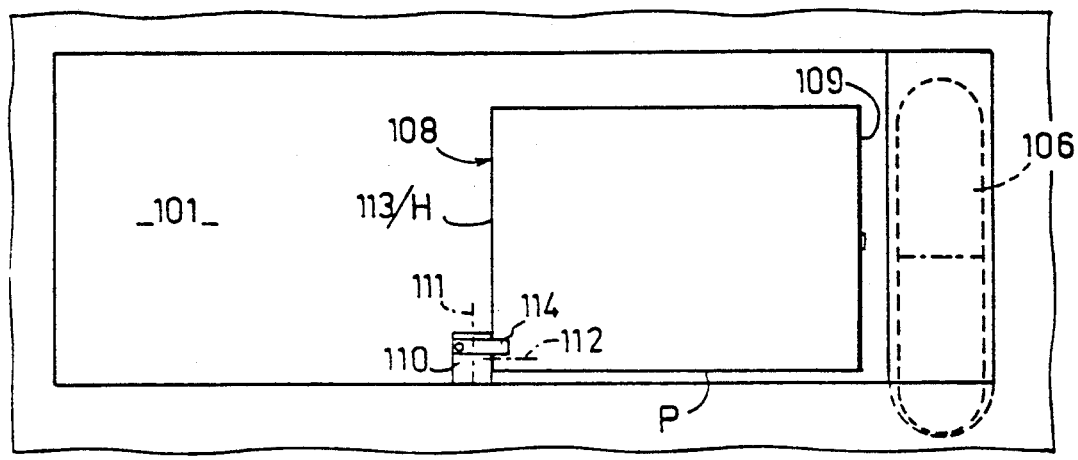
FIGS. 6A and 6B are views, from above and the front, respectively, of a second position occupied by the safe of FIG. 1.
Figure 6A:
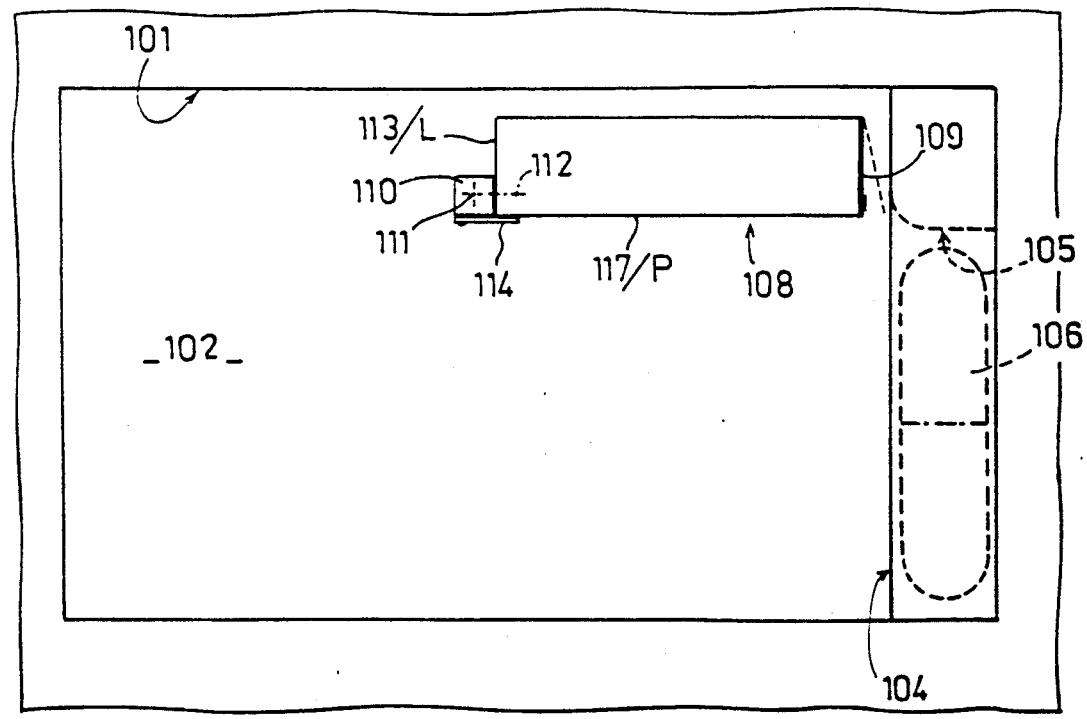

In its position shown in FIGS. 1 and 6A, 6B, the door 109 is parallel to the plane of the opening 104 of the housing 105 for the spare wheel 106. The safe is arranged along the vertical rear wall 101 of the boot and its longitudinal dimensions, corresponding to width L, are small. On the contrary, it is difficult, if not impossible, to open the door 109 and to place an object in the safe or to remove it therefrom. The tongue 114, on which the front face 117 of the safe abuts, maintains the latter with this front face 117 vertical, preventing the safe from pivoting about axis 112.

Figure 5B:
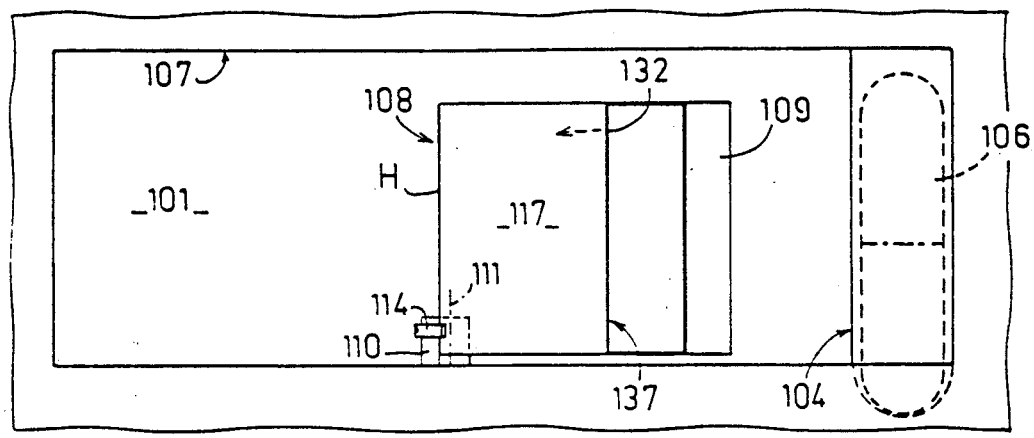
FIGS. 5A and 5B are views, from above and the front, respectively, of a first position occupied by the safe of FIG. 1.
Figure 5A:
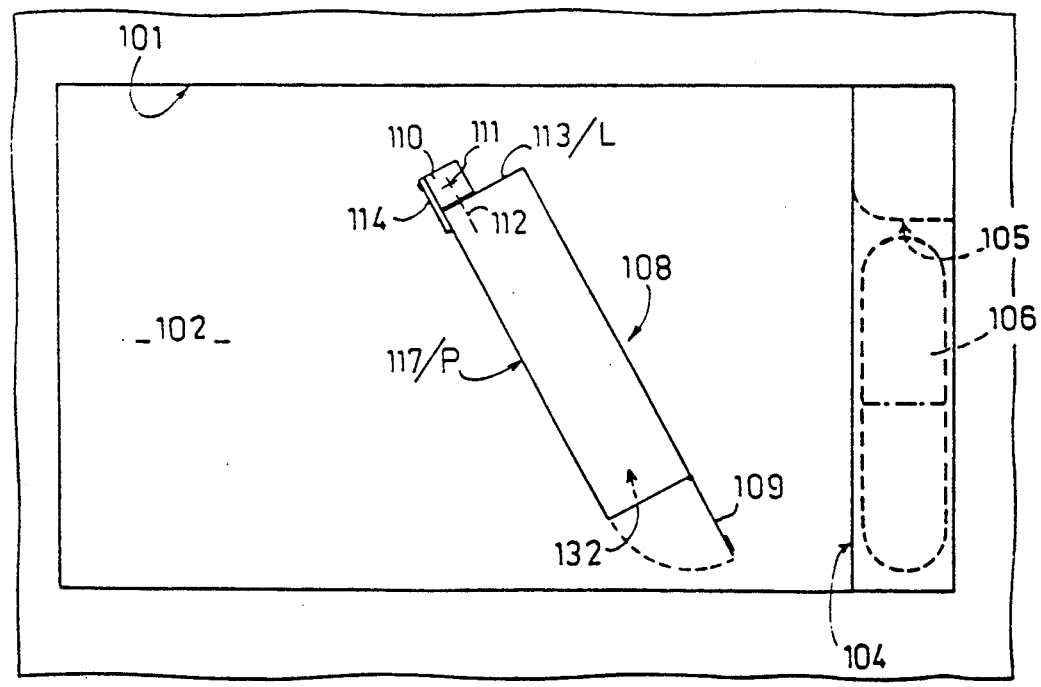

In order to be able to open door 109 and to have access to the interior of the safe, the user, starting from the position of FIGS. 6A, 6B, causes the support 110 (and consequently also the safe 108) to pivot about the vertical axis 111, up to the new position of FIGS. 5A, 5B. The safe 108 occupies a large space in the longitudinal direction of the boot, but the door 109 may be opened and reveals the opening 137 of the safe. It is easy, in this position, to place an object inside the safe and to remove it therefrom. There again, the tongue 114 avoids an undesirable pivoting of the safe about the horizontal axis 112.

Finally, it may be that, when there is no need to have access to the interior of the safe, the user desires to be able to use the complete length of the boot, even if he has only a smaller useful height available. In that case, he may pivot the tongue 114 from the position of FIGS. 6A, 6B, to release pivoting of the safe 108 about the horizontal axis 112. In this way, the safe is placed in the position of FIGS. 7A, 7B, with its width which extends vertically (FIG. 7B), over a relatively short distance, releasing above the safe the whole length of the boot. The large faces of the safe are then substantially parallel to the floor 102, and suitcases, even ones of large longitudinal dimensions, may be placed above the safe 108.

In the position of FIGS. 6A, 6B, in order to clear the boot, the large dimension (depth P) has been disposed parallel to the rear wall 101 of the boot, the smallest dimension (width L) extending perpendicularly to said rear wall 101, with the result that, in this direction, the bulk of the safe is minimum.

In the position of FIGS. 7A, 7B, the same reasoning has been applied, but with respect to the floor 102. The depth P is therefore parallel to the floor 102, and the width L perpendicular to said floor (therefore vertical).

Another application of the device of FIGS. 2, 3 and 4 is shown in FIGS. 8A, 8B, 9A, 9B, 10A, 108, 11A and 11B.

The safe is firstly shown (FIGS. 8A, 8B) in the position where a user has access to the interior 132, door 109 being open. Here, the width L constitutes the largest dimension, height H the smallest dimension and depth P the intermediate dimension. Door 109 leaves open the vertical front face for introduction of the objects into the safe. The width L and depth P are parallel to floor 102 and the height H extends vertically. The dimensions of the floor 102 of the boot are large.

It will have been observed that the safe is mounted to pivot, with respect to support 110, about horizontal axis 112 by means of a screw (not shown), which is introduced into the tapped hole 129, shown in FIG. 4.

Figure 8B:
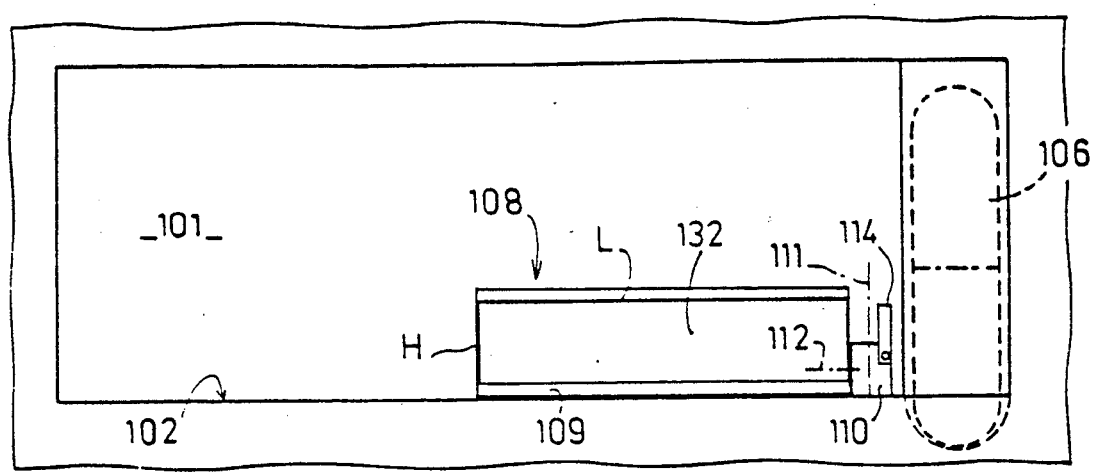
FIGS. 8A and 8B are views, from above and the front, respectively, of a second variant embodiment disposed in a first position of use.
Figure 8A:
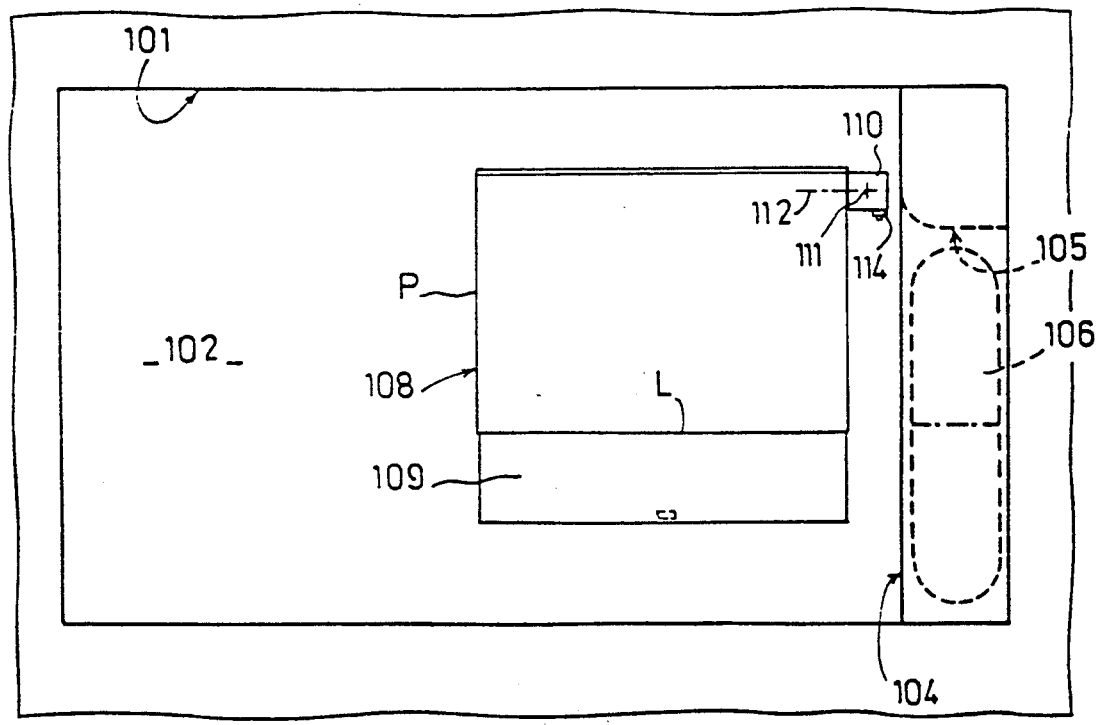
Figure 9B:
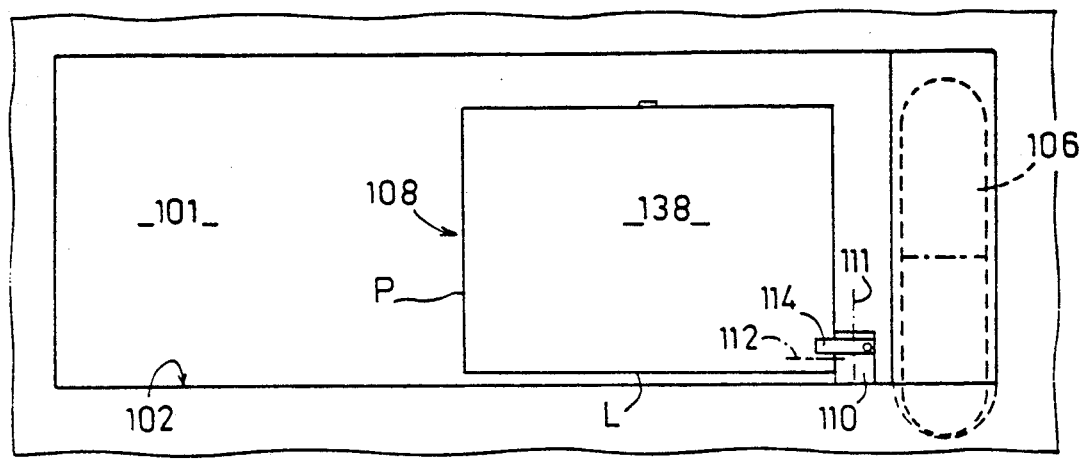
FIGS. 9A and 9B are views, from above and the front, respectively, of a second position occupied by the safe of FIGS. 8A and 8B.
Figure 9A:
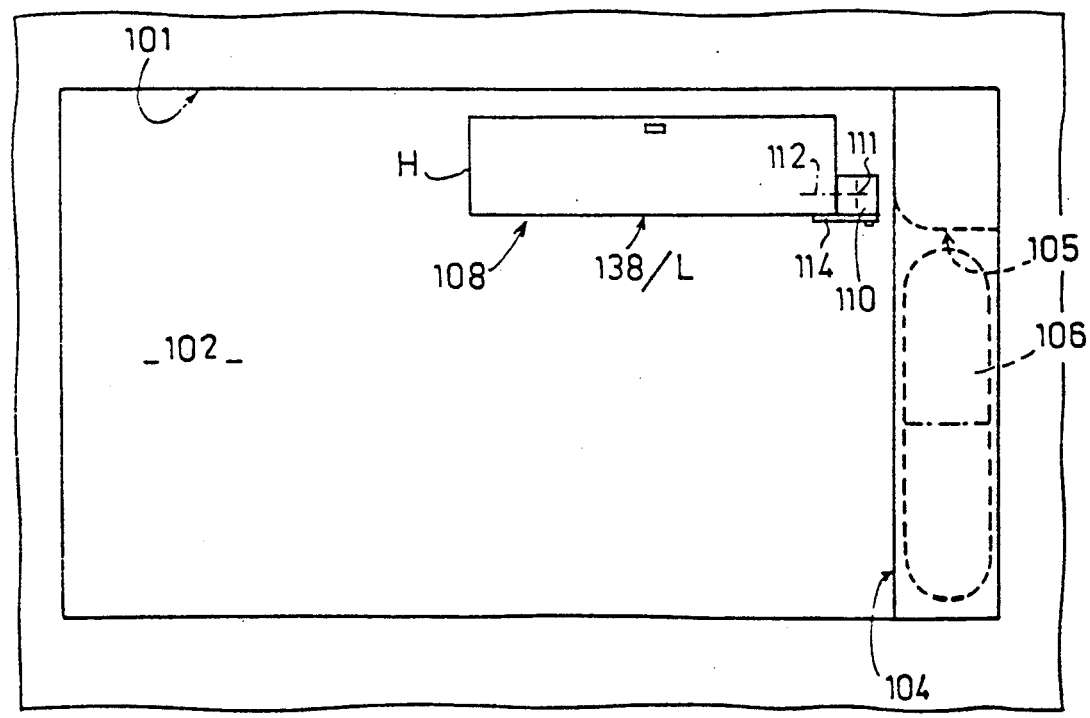

In order to clear a large part of the floor 102, the user of the arrangement of FIGS. 8A, 8B may, after having closed the door 109 of the safe 108, straighten the safe vertically, by pivoting it about the horizontal axis 112 until it arrives in the position of FIGS. 9A, 9B. The depth P and the width L are parallel to the rear wall 101 of the boot and the smallest dimension, height H, is horizontal, perpendicular to said rear wall 101: the dimensions of floor 102 have been considerably reduced (FIG. 9A) and, in order to maintain the large faces of the safe, defined by the depth P and width L, vertical, the tongue 114 is positioned in front, which becomes the visible front face 138 of the safe 108.

Figure 10B:
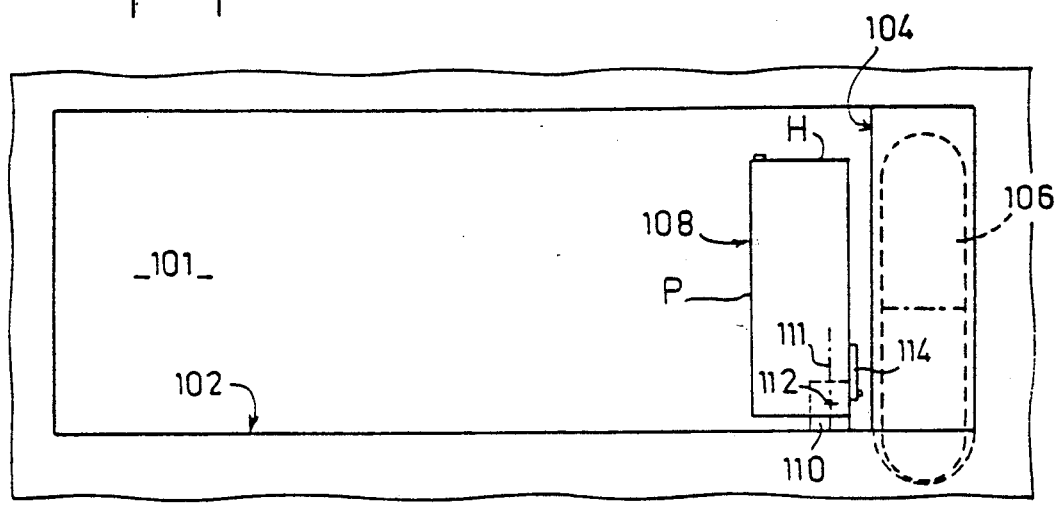
FIGS. 10A and 10B are views, from above and the front, respectively, of a third position occupied by the safe of FIGS. 8A and 8B.
Figure 10A:
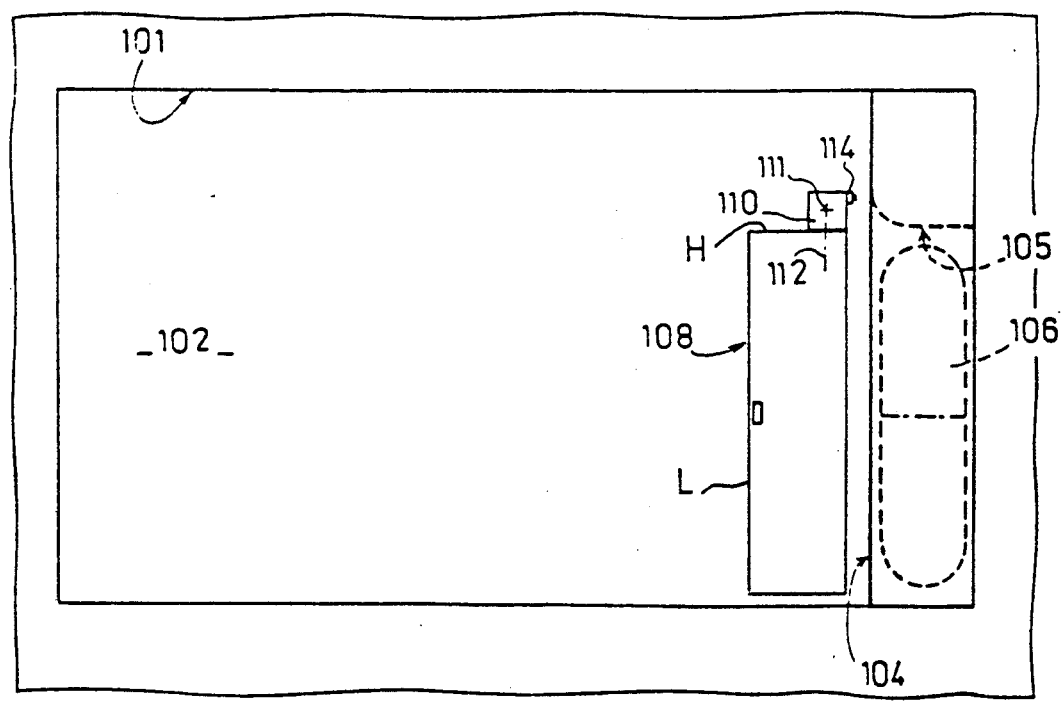
Figure 11B:
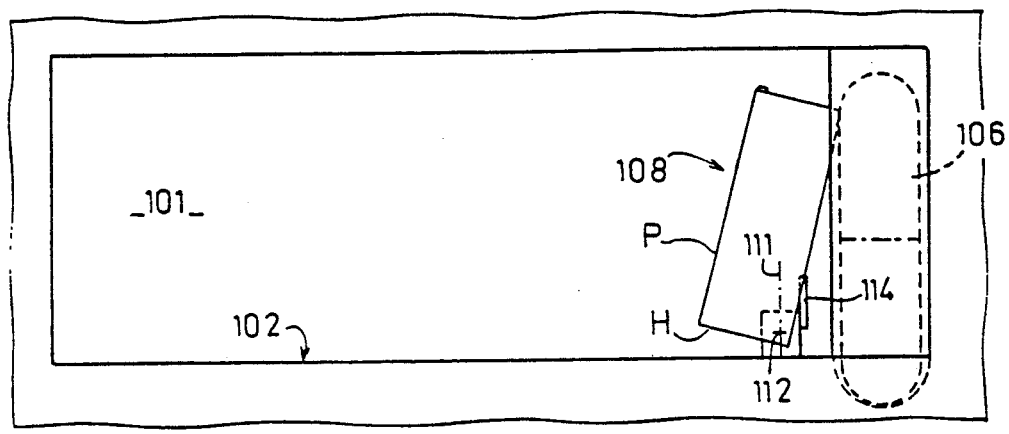
FIGS. 11A and 11B are views, from above and the front, respectively, of another third position occupied by the safe of FIGS. 8A and 8B.
Figure 11A:
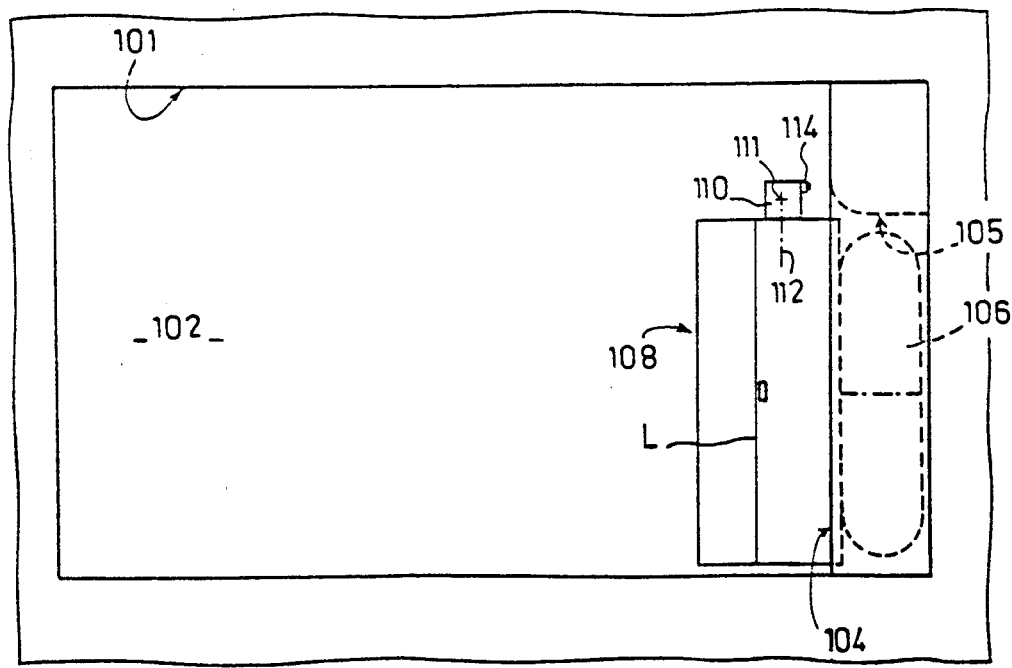

Furthermore, the user may wish not to waste anything lengthwise of the dimension (of the depth) of the boot and prefer to accept a slight reduction in the space available breadthwise of the boot. In that case, it suffices to place the safe along the opening 104 of the housing for the spare wheel 106 (FIGS. 10A, 10B). To that end, starting from the position shown in FIGS. 9A, 9B, the user pivots through about 90°, about vertical axis 111, the safe 108 whose depth P and width L are parallel to the plane of opening 104, the width L extending horizontally, the depth P extending vertically. The smallest dimension, height H, of the safe extends perpendicularly to the plane of the opening 104. The safe therefore takes up little space breadthwise of the boot, and in particular has cleared the space that it occupied, longitudinally, in the position shown in FIGS. 9A, 9B.

In order further to reduce the breadthwise dimensions of the boot, the safe 108 may, from the position shown in FIGS. 10A, 10B, be slightly pivoted inside the housing 105 for the spare wheel 106 in which its upper part penetrates through opening 104, until it abuts on the spare wheel. This is the position of FIGS. 11A, 11B which follows from that of FIGS. 10A, 10B by pivoting the safe 108 about the horizontal axis 112.

It must be observed that the fixation of the safe cannot be dismantled by any one who does not have the key to the safe door and who therefore does not have access to the interior of the safe 108. In fact, the lower plate 121 being applied on the lower face 102b, the catches 123 are inaccessible and cannot be sawn, which would enable the plate 121 to be unscrewed from support 110. Neither can the threaded rod 119 be sawn at the level of plate 126, as the clearance J does not allow passage of a saw blade. The nut 127 cannot be unscrewed since, after the support 110 has been screwed on the threaded rod 119, this nut 127 is dissimulated inside the recess 128. Finally, the safe 108 can be detached from the support 110 only by the person who can remove the screw 130-131, i.e. by the owner of the safe, who possesses the key thereof, thus has access to the interior 132 of the safe and may attain the screw head 131.

Preferably, the threaded rod 119 initially has a height greater than the sum of the assembled parts, with the result that an excess 119a of this threaded rod projects from the upper face of the support 110. It suffices, at the moment of assembly, to cut the threaded rod in order to eliminate this excess 119a. In this way, with one sole model of threaded rod 119, assembly may be ensured on all vehicles, whatever the thickness of their floor 102.

The means for rendering the rod 119 fast with the floor 102, which has been described with reference to FIGS. 2, 3 and 4, implies the possibility for the user to pierce right through the floor 102, in particular 35 particular having access to its lower face 102b. This possibility does not always exist, at least with ease, particularly due to the location of the fuel tank under the floor, in the zone where it would be necessary to position the plate 121.

Figure 12:
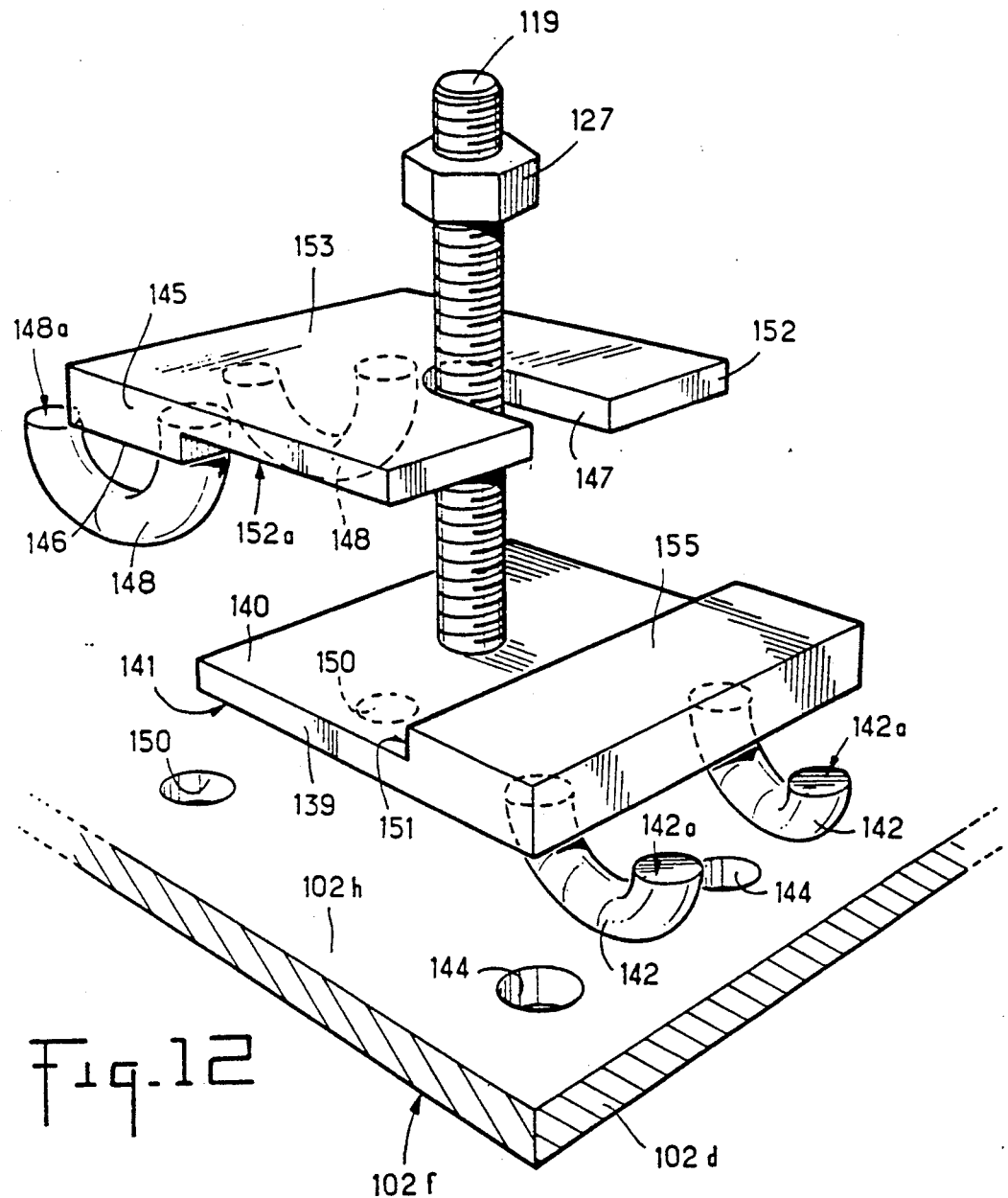
FIG. 12 in a perspective view, a variant embodiment of the element illustrated in FIGS. 2 to 4.
Figure 13:
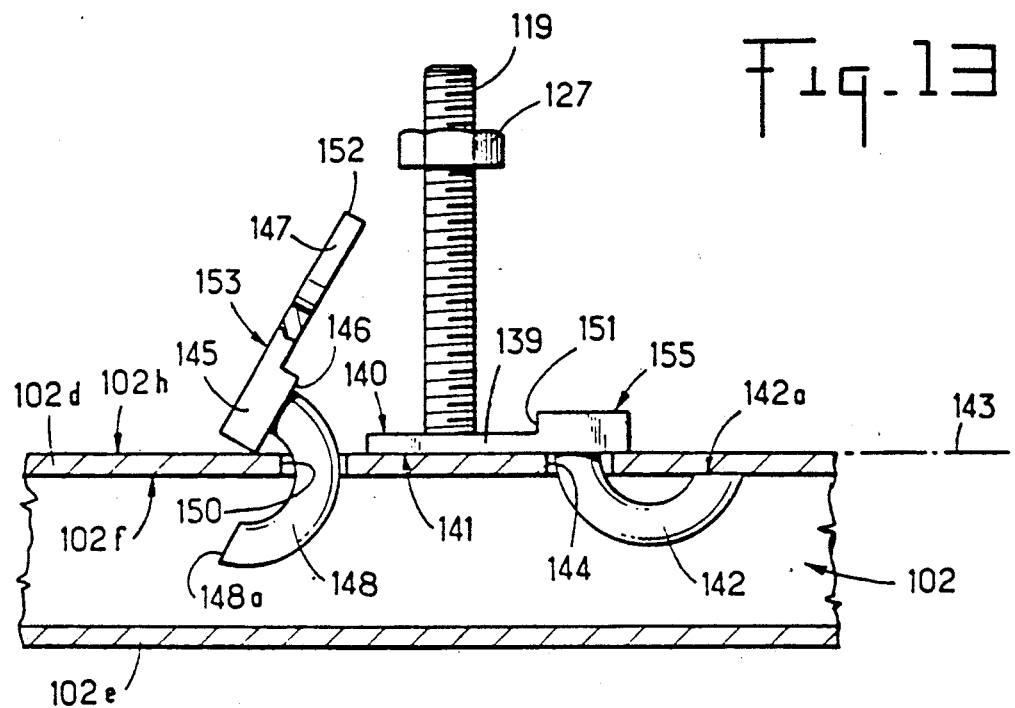
FIGS. 13 and 14 are two sections showing two successive phases of the assembly of the element of FIG. 12.
Figure 14:
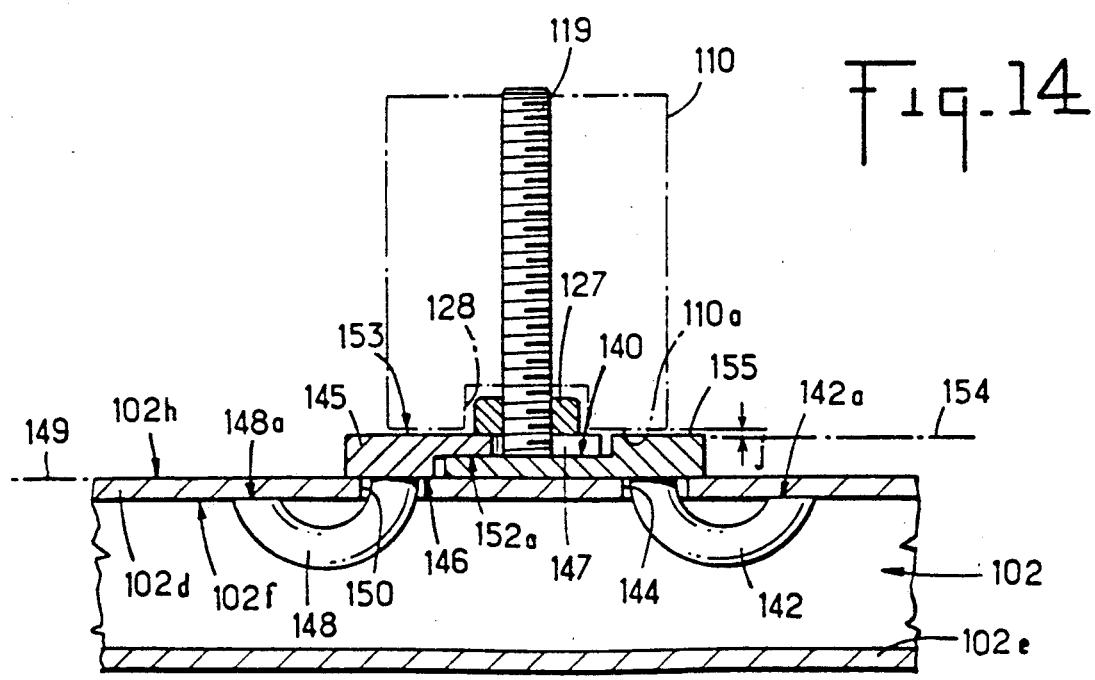

In this latter case, the user may resort to an assembly different from the preceding one, but performing the same function, namely the joining of the rod 119 with the floor 102: this other assembly is shown in FIGS. 12, 13 and 14.

The floor 102 comprises two sheets spaced apart from each other, a lower sheet 102e and an upper sheet 102d, itself defined by a first lower face 102f and a second upper face 102h.

A first plate 139 itself comprises a first upper face 140 and a second lower face 141 and is provided with two first hooks 142 which are fast therewith, fixed on the second face 141, and are curved towards the plane 143 of this second face 141, being spaced apart therefrom. The rod 119 is erected substantially perpendicularly from the first face 140. The upper sheet 102d of the floor is traversed by two first holes 144, which are disposed so as to allow passage of the free ends 142a of the hooks 142.

A second plate 145 comprises a lower face 146 and a notch 147 for passage of the rod 119. Two second hooks 148 are fast with the second plate 145, are fixed on its lower face 146 and are curved towards the plane 149 of this lower face 146, being spaced apart therefrom. The upper sheet 102d of the floor is traversed by two second holes 150, which are disposed so as to allow passage of the free ends 148a of the hooks 148. It should be noted that the first plate 139 presents an excess thickness 151 which corresponds to the thickness of a thinned part 152 of the second plate.

The presentation of the parts is shown in FIG. 12.

From the configuration of this FIG. 12, the ends 142a of the first hooks 142 are introduced into the holes 144 until the second face 141 of the first plate rests on the second face 102h of the sheet 102d and the ends 142a of the hooks 142 are then in contact with the first face 102f of the sheet 102d (FIG. 13). Then, the ends 148a of the hooks 148 are in turn introduced into the second holes 150, until the lower face 146 of the second plate 145 rests on the second face 102h of the sheet 102d, and the ends 148a of the hooks 148 are then in contact with the first face 102f of the sheet 102d (FIG. 14).

In this configuration of FIG. 14, the rod 119 has had the possibility of penetrating in the notch 147; the lower face 152a of the thinned part 152 of the second plate 145 rests on the first face 140 of the first plate 139; finally, the nut 127 is completely screwed and abuts on the upper face 153 of the second plate 145 and thus assembles the first (139) and second (145) plates, the first hooks 142 and the second hooks 148 preventing separation of the assembly of these two plates from the sheet 102d. In this way, the rod 119 is fixed on the floor 102 and then allows assembly of the support 110 already described with reference to FIGS. 2 to 4. All that has been defined hereinbefore concerning this support 110 is resumed here, the lower face 110a of the support being disposed opposite the common plane 154 of the upper face 153 of the second plate 145 and of the upper face 155 of the excess thickness 151, being spaced apart therefrom by the value of the clearance J.

Another variant embodiment is shown with reference to FIGS. 15 to 18, which illustrate a safe according to the invention, installed in the boot of a private car. This safe has dimensions which make it possible for example to protect an attaché case containing precious documents.

The following parts of the vehicle are shown: the upper face 1a of the horizontal floor 1 of the boot, constituted by a steel sheet; the face 2a of the vertical (substantially vertical) wall 2, defining the wall of the boot, and extended in its upper part by a horizontal shelf 3. The wall 2 and the shelf 3 define the interior 4: the backrest 5 of the rear seat of the vehicle abuts on the wall 2. A stiffener 6, forming longitudinal element, is fixed on the lower face 1b of the sheet 1. The wall 2 intersects the floor 1 along an edge 7, parallel to the direction D of the width of the vehicle.

The boot contains a safe constituted by the following six outer faces, parallel in two's, defined with respect to a first position of this safe shown in broken lines in FIG. 18: the substantially horizontal lower face 8; the upper face 9, parallel and opposite face 8; the rear face 10, substantially vertical and substantially parallel to the wall 2 of the interior; the front face 11, parallel to and opposite the face 10 and constituting the door of the safe, mounted to pivot about a horizontal geometrical axis 15 located in the low part of face 11; the vertical face 12 which defines the left-hand lateral wall 14; and the opposite vertical face 13 which defines the right-hand lateral wall of the safe. These various faces intersect along the following edges: faces 8 and 11, 8 and 10, 9 and 11 and 9 and 10 have in common, respectively, edges 16, 17, 18 and 19, which define the width L of the safe and which are parallel to the edge 7 of the boot; the faces 10 and 12, 10 and 13, 11 and 12 and 11 and 13 have in common, respectively, the edges 20, 21, 22 and 23, which define the height H of the safe; finally, faces 8 and 12, 8 and 13, 9 and 12 and 9 and 13 have in common, respectively, edges 24, 25, 26 and 27 which define the depth P of the safe. Face 8 defines the wall 28, whilst face 10 defines wall 29 of the safe.

Two rods 30 are erected vertically along the lateral vertical faces 12 and 13 of the safe, on either side of this safe, are provided at their lower ends with support plates 31 made of steel, which are welded thereto, have their upper parts provided with a thread 32 and pass through holes 33 made in the stiffeners 6 and in the floor 1, being introduced from underneath the boot until the support plates 31 come into abutment on the lower face 6a of the stiffeners 6. Nuts 34, made in thick cylindrical washers, cooperate with the threads 32 of the rods 30 and definitively fix these rods on the floor 1, being oriented so that the plane faces of the washers constituting them are parallel to the vertical lateral faces 12 and 13 of the safe, these washers being spaced apart just sufficiently to allow the introduction of the safe therebetween, said vertical faces 12 and 13 being disposed opposite and adjacent said washers. The wall 14 of the safe and the opposite parallel wall, are pierced in their lower rear parts (when the safe is placed flat on the floor, as shown in discontinuous lines in FIG. 18), with a hole 35. In the thickness of each nut 34, a tapped hole 36 is made, opposite which a hole 35 may be disposed. Two screws 37 (only one visible) are introduced into the safe, whilst the door 11 is open, each traverse a hole 35 and are each screwed in a tapped hole 36 until, on the one hand, each screw 37 is screwed completely in the tapped hole 36 and, on the other hand, the safe then pivots freely about the common geometrical axis 38 of the screws 37, the heads 37a of the screws 37 forming displacement stops for the inner faces of the two vertical lateral walls of the safe. It should be noted that the axis 38 is at right angles to the axis of each rod 30, but does not intersect this axis of each rod 30.

In the upper part of the threads 32 of rods 30, supports 39 are screwed and are immobilized by nuts and counter-nuts 40. Each support 39 bears a pivoting latch 41, whose pivoting is limited by a catch 42, the latch then being horizontal and capable, as shown in FIGS. 15 and 17, of maintaining the safe vertically, forming stops for the face 8 of said safe.

Finally, adjustable stops 43 are screwed on the rear wall 44 of the safe (the one which supports face 10) and make it possible to maintain the safe with its faces 8 and 9 vertical, in the second position that this safe may occupy. In this second position, the face 9 is disposed opposite and in the vicinity of the face 2a of the wall 2 and the bulk of the safe is reduced, taking into account the fact that its height H is notably smaller than its depth P and, in this second position, the height H extends horizontally and the depth P extends vertically within the boot. In this way, the rest of this boot is still large enough to store actual luggage.

The safe may be maintained in its second position thanks to latches 41 and may very easily be returned into its first position (broken lines in FIG. 18) so that the user has access to its interior, by pivoting through about 90° about the geometrical axis 38.

Of course, it was necessary to design a means which renders the safe non-displaceable, otherwise its function of safe storage of the important objects or documents was not performed.

The pivoting assembly of the safe about axis 38, which has been provided, effectively ensures non-displacement of the safe from the boot, as the nuts 34 and those parts of the rods 30 on which they are screwed, like the screws 37 themselves, are not destructible rapidly and non-dismountable when the door 11 of the safe is closed. In fact, screws 37 are assembled when this door 11 is open, dismantling being impossible after closure of the door 11, i.e. whilst the safe protects the precious objects or documents.

It has been noted that, when the safe is placed in its second position (FIG. 18, solid lines), the face 10 does not rest on the face 1a of the floor 1, as a slight space K must be arranged to allow passage of the edge 17 during pivoting of the safe about axis 38. This is the reason for the presence of the stops 43.

Such a safe may also be mounted, with the same device as the one which has been described, within the interior of the vehicle, for example near the front faces of the front seats, in a mobile machine such as a crane or mobile hydraulic shovel, or in a dwelling, behind an armchair, for example.

The invention is not limited to the embodiments shown, but covers, on the contrary, all the variants which may be made thereof without departing from its scope nor spirit.

What is claimed is:

1. In a safe assembly whose outer shape is generally parallelepipedic, defined by a width, a height and a depth, the height or width being notably smaller than the depth thereof, said safe assembly being mounted on a fastening structure;

said safe assembly being mounted on the structure by means of at lest one first pivot pin permanently oriented in a direction substantially parallel to a face of the safe assembly defined by said height and width and substantially at right angles to that of these two dimensions which is notably smaller than the depth;

said first pivot pin being situated in a position offset from a central part of the safe assembly so that, with respect to said structure, this safe assembly is capable of occupying a first position, in which, the depth is nonparallel to a first reference plane and being perpendicular or oblique with respect to said first reference plane, the inconvenience of the bulk of the safe assembly being considerable, and a second position which follows from said first position by pivoting the safe assembly about the first pivot pin and in which the depth extends parallel to said first reference plane, the inconvenience caused by the bulk of the safe assembly then being considerably reduced compared to that corresponding to the first position of the safe assembly; and a second pivot pin is provided substantially orthogonal to said first pivot pin being inaccessible from the environment outside the safe assembly, said second pivot pin providing a pivoting assembly for the safe assembly with respect to a support which, itself, is mounted to pivot with respect to the structure about said first pivot pin, so that, with respect to said structure, the safe assembly is capable of occupying a third position which follows from the second position at least by a pivoting of the safe assembly about the second pivot pin such that the depth extends parallel to a second reference plane, and, the inconvenience caused by the bulk of the safe assembly being considerably reduced compared to that corresponding to said first position of said safe assembly.

2. The safe assembly of claim 1, wherein said safe assembly comprises a device for selectively holding the safe assembly in said second position.

3. The safe assembly of claim 1, wherein:

said first pivot pin comprises a rod presenting two ends, a first of said ends being rendered fixed with the structure and the second end being threaded;

said support comprises a tapped bore which cooperates with said second threaded end of the rod for pivoting assembly of said support, a tapped hole whose axis is orthogonal to that of said bore, and a screw comprising a screw head and a threaded part for forming said second pivot pin, said threaded part traversing a hole provided in one of the walls of the safe assembly, the screw head being disposed inside the safe assembly and the threaded part of the screw cooperating with the tapped hole for pivoting of the safe assembly with respect to the support.

4. The safe assembly of claim 3, wherein the first end of the rod is fixed with a plate provided with at least one catch, and the structure comprises a through hole adapted to be traversed by said rod and sat least one housing adapted to receive said catch, the rod traversing the hole, the catch being received in the housing, and a nut cooperating with the thread of the second end of the rod for fixation of said rod on the structure until said plate is applied on a face defining the structure.

5. The safe assembly of claim 4, wherein the support comprises a recess in which the nut is capable of being contained.

6. The safe assembly of claim 3, wherein the first end of the rod is fast with a first face of a first plate, at least two first curved hooks are fast with said first plate, being fixed on a second face of this first plate opposite said first face and each comprise a free end oriented towards and moved away from the plane of the second face of the first plate, the structure comprises a first face oriented in direction opposite that of erection of the threaded rod with respect to said structure, a second face opposite said first face of the structure, and first holes for passage of said first hooks, a second plate comprises, on the one hand, at least one second curved hook which is fast therewith and which is fixed on a face of this second plate, each second hook comprising a free end oriented towards and moved apart from the plane of said face of the second plate, on the other hand, a notch for passage of said rod, the structure further comprises at least one second hole for passage of the at least one second hook, and the assembly of said first and second plates on the structure is such that the first hooks pass through the first holes until, on the one hand, the second face of the first plate is in abutment on the second face of the structure, on the other hand, the free ends of the first hooks are located in the vicinity of or in contact with the first face of the structure; the second hook(s) pass through the corresponding at least one second hole until, on the one hand, the face of the second plate is in abutment on the first face of the first plate, on the other hand, the free end of each second hook is located in the vicinity of or in contact with the first face of the structure; said rod has traversed the notch of the second plate; and a ut, cooperating with the threaded end of the rod, maintains the first and second plates in mutual abutment and assembled, consequently preventing the first and second hooks from leaving their respective holes.

7. The safe assembly of claim 1, wherein:

said first pivot pin comprises a rod presenting two ends, a first of said ends being rendered fixed with the structure and the second end being threaded;

said support comprises a tapped bore which cooperates with said second threaded end of the rod for pivoting of said support, a tapped hole whose axis is orthogonal to that of said bore, and a screw comprising a screw head and a threaded part, for forming said second pivot pin, said threaded part traversing a hole provided in one of the walls of the safe assembly, the screw head being disposed inside the safe assembly and the threaded part of the screw cooperating with the tapped hole for pivoting of the safe assembly with respect to the support, and wherein said support further comprises a device for selectively holding the safe assembly in said second position.

8. The safe assembly of claim 7, wherein the first end of the rod is fixed with a plate provided with at least one catch and the structure comprises:
- a through hole adapted to be traversed by said rod;
- at least one housing adapted to receive said catch, the rod traversing the hole, the catch being received in the housing; and
- a nut cooperating with the thread of the second end of the rod for fixation of said rod on the structure until said plate is applied on a face defining the structure.

9. The safe assembly of claim 8, wherein the support comprises a recess in which the nut is capable of being contained.

10. The safe assembly of claim 9, wherein a tongue is mounted to pivot on the support, a stop for limiting clearance thereof is fixed with said support, and the tongue constitutes a device for selectively holding the safe assembly in said second position.

11. The safe assembly of claim 7, wherein:
- the first end of the rod is fast with a first face of a first plate;
- at least two first curved hooks are fast with said first plate, being fixed on a second face of this first plate opposite said first face and each comprise a free end oriented towards and moved away from the plate of the second face of the first plate;
- the structure comprises a first face oriented in direction opposite that of erection of the threaded rod with respect to said structure, a second face opposite said first face of the structure, and first holes for passage of said first hooks;
- a second plate comprises, on the one hand, at least one second curved hook which is fast therewith and which is fixed on a face of this second plate, each second hook comprising a free end oriented towards and moved apart from the plane of said face of the second plate, on the other hand, a notch for passage of said rod;
- the structure further comprises at least one second hole for passage of the at least one second hook; and
- the assembly of said first and second plates on the structure is such that:
- the first hooks pass through the first holes until, on the one hand, the second face of the first plate is in abutment on the second face of the structure, on the other hand, the free ends of the first hooks are located in the vicinity of or in contact with the first face of the structure;
- the at least one second hook pass through the corresponding at least one second hole until, on the one hand, the face of the second plate is in abutment on the first face of the first plate, on the other hand, the free end of each second hook is located in the vicinity of or in contact with the first face of the structure;
- said rod has traversed the notch of the second plate; and
- a nut, cooperating with the threaded end of the rod, maintains the first and second plates in mutual abutment and assembled, consequently preventing the first and second hooks from leaving their respective holes.

12. The safe assembly of claim 7, wherein a tongue is mounted to pivot on the support, a stop for limiting clearance thereof is fixed with said support, and the tongue constitutes a device for selectively holding the safe assembly in said second position.

13. In a safe assembly whose outer shape is generally parallelepipedic, defined by a width, a height and a depth, the height or width being notably smaller than the depth thereof, said safe assembly being mounted on a fastening structure;
- said safe assembly being mounted on the structure by means of at least one first pivot pin permanently oriented in a direction substantially parallel to a face of the safe assembly defined by said height and width and substantially at right angles to that of these two dimensions which is notably smaller than the depth;
- said first pivot pin being situated in a position offset from a central part of the safe assembly so that, with respect to said structure, this safe assembly is capable of occupying a first position, in which, the depth is nonparallel to a first reference plane and being perpendicular or oblique with respect to said first reference plane, the inconvenience of the bulk of the safe assembly being considerable, and a second position which follows from said first position by pivoting the safe assembly about the first pivot pin and in which the depth extends parallel to said first reference plane, the inconvenience caused by the bulk of the safe assembly then being considerably reduced compared to that corresponding to the first position of the safe assembly; and
- wherein; the first pivot pin is mounted on a support which is itself mounted to a second pivot pin substantially orthogonal to said first pivot pin and inaccessible from the environment outside the safe assembly, so that, with respect to said structure, the safe assembly is capable of occupying a third position which follows form the second position at least by a pivoting of the safe assembly about the second pivot pin such that the depth extends parallel to a second reference plane, and the inconvenience caused by the bulk of the safe assembly is considerably reduced with respect to that corresponding to said first position of the safe assembly.

14. The safe assembly of claim 13, wherein a tongue is mounted to pivot on the support, a stop for limiting clearance thereof is fixed with said support, and said tongue constitutes a device for selectively holding the safe assembly in said second position.

15. The safe assembly of claim 13, wherein:
- said first pivot pin comprises a rod presenting two ends, a first of said ends being fixed with the structure and the second end being threaded;
- said support comprises a tapped bore which cooperates with said second threaded end of the rod for pivoting assembly of said support, a tapped hole whose axis is orthogonal to that of said bore, and a screw comprising a screw head and a threaded part for forming said second pivot pin, said threaded part traversing a hole provided in one of the walls of the safe assembly, the screw head being disposed inside the safe assembly and the threaded part of the screw cooperating with the taped hole for pivoting of the safe assembly with respect to the support.

16. The safe assembly of claim 15, wherein the first end of the rod is fixed with a plate provided with at least one catch, and the structure comprises:
- a through hole adapted to be traversed by said rod;

at least one housing adapted to receive said catch, the rod traversing the through hole, the catch being received in the at least one housing; and a nut cooperating with the thread of the second end of the rod for fixation of said rod on the structure until said plate is applied on a face defining the structure.

17. The safe assembly of claim 16, wherein the support comprises a recess in which the nut is capable of being contained.

18. The safe assembly of claim 17, wherein a tongue is mounted to pivot on the support, a stop for limiting clearance thereof is fixed with said support, and the tongue constitutes a device for selectively holding the safe assembly in said second position.

19. The safe assembly of claim 15, wherein the first end of the rod is fast with a first face of a first plate;
   at least two first curved hooks are fast with said first plate, being fixed on a second face of this first plate opposite said first face and each comprise a free end oriented towards and moved away from the plane of the second face of the first plate;
   the structure comprises a first face oriented in direction opposite that of erection of the threaded rod with respect to said structure, a second face opposite said first face of the structure, and first holes for passage of said first hooks;
   a second plate comprises, on the one hand, at least one second curved hook which is fast therewith and which is fixed on a face of this second plate, each second hook comprising a free end oriented towards and moved apart from the plane of said face of the second plate, on the other hand, a notch for passage of said rod;
   the structure further comprises at least one second hole for passage of the at least one second hook; and
   the assembly of said first and second plates on the structure is such that:
   the first hooks pass through the first holes until, on the one hand, the second face of the first plate is in abutment on the second face of the structure, on the other hand, the free ends of the first hooks are located in the vicinity of or in contact with the first face of the structure;
   the at least one second hook pass through the corresponding at least one second hole until, on the one hand, the face of the second plate is in abutment on the first face of the first plate, on the other hand, the free end of each second hook is located in the vicinity of or in contact with the first face of the structure;
   said rod has traversed the notch of the second plate; and a nut, cooperating with the threaded end of the rod, maintains the first and second plates in mutual abutment and assembled, consequently preventing the first and second hooks from leaving their respective holes.

20. The safe assembly of claim 15, wherein a tongue is mounted to pivot on the support, a stop for limiting clearance thereof is fixed with said support, and the tongue constitutes a device for selectively holding the safe assembly in said second position.

21. The safe assembly of claim 13, wherein at least one of said first and second pivot pins, comprises:
   a rod presenting two ends;
   a first of said ends being fixed with the structure and the second end being threaded;
   said support comprises a tapped bore which cooperates with said second threaded end of the rod for pivoting assembly of said support,
   a tapped hole whose axis is orthogonal to that of said bore, and
   a screw comprising a screw head and a threaded part, having its threaded part traversing a hole provided in one of the walls of the safe assembly, the screw head being disposed inside the safe assembly and the threaded part of the screw cooperating with the tapped hole for pivoting of the safe assembly with respect to the support, and wherein the support further comprises a device for selectively holding the safe assembly in its second position.

22. The safe assembly of claim 21, wherein the first end of the rod is fixed with a plate provided with at least one catch, the structure comprises a through hole adapted to be traversed by said rod and at least one housing adapted to receive said catch, the rod traversing the hole, the catch being received in the housing, and a nut cooperating with the thread of the second end of the rod for fixation of said rod on the structure until said plate is applied on a face defining the structure.

23. The safe assembly of claim 22, wherein the support comprises a recess in which the nut is capable of being contained.

24. The safe assembly of claim 23, wherein a tongue is mounted to pivot on the support, a stop for limiting clearance thereof is fixed with said support, and the tongue constitutes a device for selectively holding the safe assembly in said second position.

25. The safe assembly of claim 21, wherein:
   the first end of the rod is fast with a first face of a first plate;
   at least two first curved hooks are fast with said first plate, being fixed on a second face of this first plate opposite said first face and each comprise a free end oriented towards and moved away from the plane of the second face of the first plate;
   the structure comprises a first face oriented in direction opposite that of erection of the threaded rod with respect to said structure, a second face opposite said first face of the structure, and first holes for passage of said first hooks;
   a second plate comprises, on the one hand, at least one second curved hook which is fast therewith and which is fixed on a face of this second plate, each second hook comprising a free end oriented towards and moved apart from the plane of said face of the second plate, on the other hand, a notch for passage of said rod;
   the structure further comprises at least one second hole for passage of the at least one second hook; and
   the assembly of said first and second plates on the structure is such that:
   the first hooks pass through the first holes until, on the one hand, the second face of the first plate is in abutment on the second face of the structure, on the other hand, the free ends of the first hooks are located in the vicinity of or in contact with the first face of the structure;
   the at least one second hook pass through the corresponding at least one second hole until, on the one hand, the face of the second plate is in abutment on the first face of the first plate, on the other hand, the free end of each second hook is located in the vicinity of or in contact with the first face of the structure;

said rod has traversed the notch of the second plate; and a nut, cooperating with the threaded end of the rod, maintains the first and second plates in mutual abutment and assembled, consequently preventing the first and second hooks from leaving their respective holes.

26. The safe assembly of claim 21, wherein a tongue is mounted to pivot on the support, a stop for limiting clearance thereof is fixed with said support, and the tongue constitutes a device for selectively holding the safe assembly in said second position.

* * * * *

UNITED STATES PATENT AND TRADEMARK OFFICE
CERTIFICATE OF CORRECTION

PATENT NO. : 5,031,548
DATED : July 16, 1991
INVENTOR(S) : Gaston Huguenin

It is certified that error appears in the above-identified patent and that said Letters Patent is hereby corrected as shown below:

Column 4, line 43, "Fig. 17 a view similar" should read --Fig. 17 is a view similar--.

Column 6, line 67, "Figs. 8A, 8B, 9A, 9B, 10A, 108" should read --Figs. 8A, 8B, 9A, 9B, 10A, 10B--.

Column 8, line 12-13, "floor 102, in particular particular having access" should read --floor 102, in particular having access.

Column 11, line 10, "means of at lest one" should read --means of at least one--.

Column 12, line 1, "sat least one" should read --at least one--.

Column 14, line 36, "follows form the" should read --follows from the--.

Column 14, line 62, "taped" should read --tapped--.

Signed and Sealed this

Twenty-seventh Day of April, 1993

*Attest:*

MICHAEL K. KIRK

*Attesting Officer*   Acting Commissioner of Patents and Trademarks